UNITED STATES PATENT OFFICE.

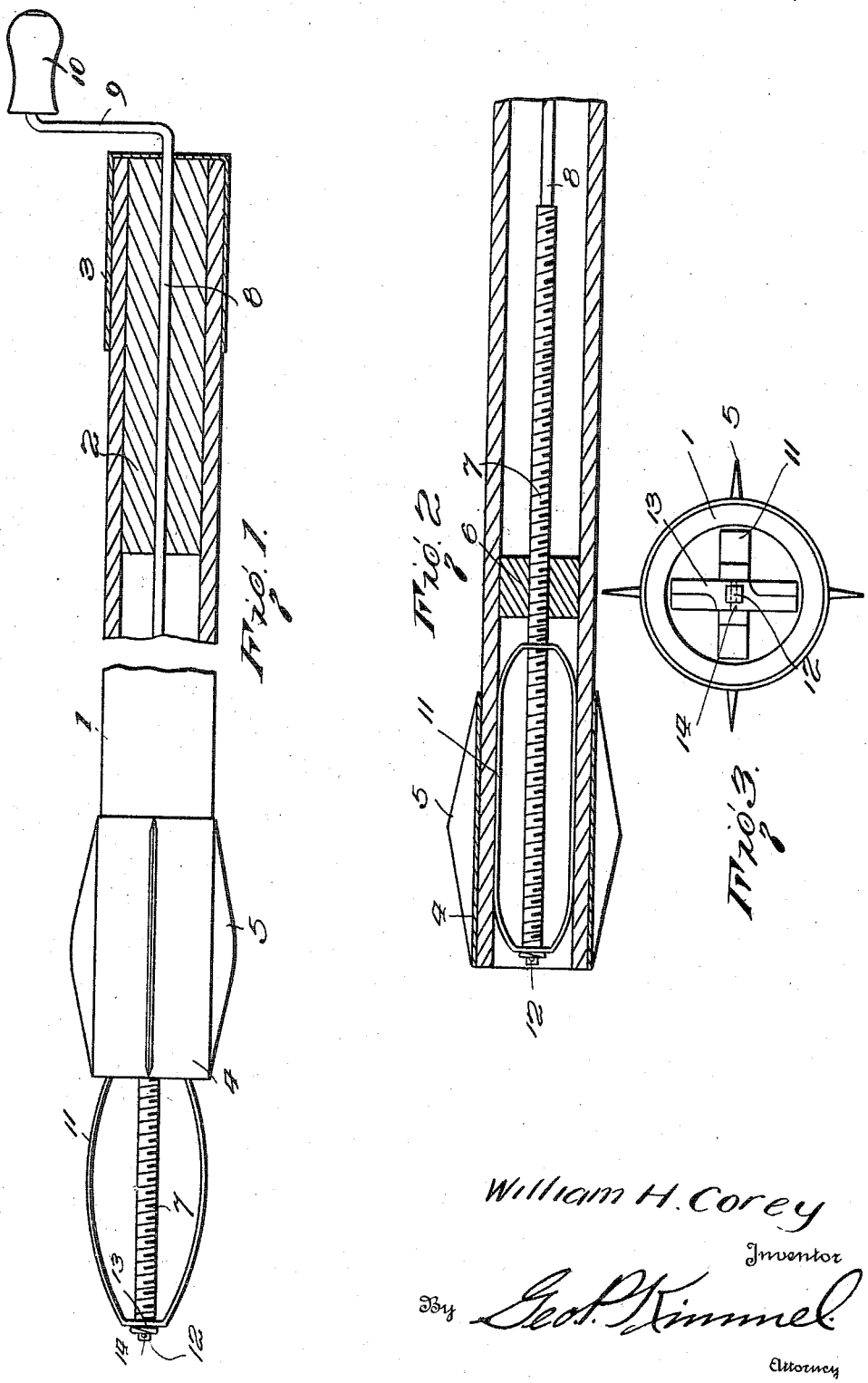

WILLIAM HENRY COREY, OF NEWPORT, MAINE.

EXTRACTOR FOR OBSTRUCTED ESOPHAGUS.

1,305,773.  Specification of Letters Patent.  Patented June 3, 1919.

Application filed March 22, 1918. Serial No. 223,954.

*To all whom it may concern:*

Be it known that I, WILLIAM HENRY COREY, a citizen of the United States, residing at Newport, in the county of Penobscot and State of Maine, have invented a new and useful Extractor for Obstructed Esophagus, of which the following is a specification.

This invention relates to improvements in veterinary appliances and it is the principal object of the invention to provide a device for removing obstructions in the esophagus of animals, such as cows, horses, etc., in an effectual manner and without doing injury to this member.

Another and equally important object of the invention is to provide a device of the character mentioned, capable of being inserted into the esophagus of an animal and having cutting means which when engaged with the obstruction will cut the same in a manner such as to allow the particles thereof to pass freely into the stomach of the animal.

Other objects will be in part obvious and in part pointed out hereinafter.

The invention consists, furthermore, in the novel arrangements and combinations of the parts of the device as well as in the details of the construction of the same, all of which will be more fully described in the following specification and then finally embodied in the clauses of the claim, which are appended to this specification and which form an essential part thereof.

In the drawings:

Figure 1 is a side elevation of the improved device having parts broken away and shown in section, Fig. 2 is a fragmentary longitudinal section through the same showing the mounting of the cutting means therein, and Fig. 3 is an end elevation thereof.

Having more particular reference to the drawings, in connection with which like reference characters will designate corresponding parts throughout the several views, 1 represents the tubular flexible casing of the device having a plug 2 arranged in one end thereof which as will be noted, is provided with a longitudinally disposed concentric bore, the purpose of which will be hereinafter apparent. A cap 3 formed of metal or similar material is arranged over the end of the casing 1 having the plug 2 arranged therein, while upon the opposite end of said casing a metal sleeve 4 is fitted and as will be noted, has a plurality of radially disposed cutting blades or elements 5 positioned thereon, which elements are formed with inclined cutting edges. A second plug or insert 6 is arranged in the casing 1 in proximity to the remaining end of the same and is formed with a concentrically disposed screw threaded bore through which a screw threaded rod 7 is passed, the inner end of said rod being connected to a flexible operating shaft 8 having its outer end engaged by a crank 9 carrying a handle 10 upon its free extremity.

Arranged upon the outer end of the screw threaded shaft 7 is a reamer indicated in its entirety by the numeral 11, which as will be noted, is composed of a pair of right angularly disposed substantially elliptical blades having alined openings formed in the ends thereof in order that the same may be engaged with the adjacent portion of said shaft. A squared extension 12 is formed upon that end of the shaft 7 adjacent the outer end of the reamer 11 and receives a rotatable cutting element 13 thereon, which is held against displacement by means of a locking pin 14 passing through a suitable opening formed in said extension.

In using my improved device, the casing 1 is inserted into the esophagus of an animal and is moved therethrough into engagement with the obstruction. At this time, the screw threaded shaft 7 is rotated by means of the crank 9, thus, causing the cutter 13 to be moved into engagement with said obstruction and to remove a portion thereof, whereupon the reamer 11 will be engaged with the same and will move therethrough and form a bore in the same. At this time, the casing 1 is moved forwardly to cause the blades 5 to be engaged with the obstruction and to divide the same in quarters, hence, reducing it and allowing the particles to freely pass into the stomach of the animal. To remove the device, the shaft 7 is rotated in a reverse direction to cause the reamer 11 to be moved into the casing, whereupon the same may be then removed from the esophagus. If desired, the device may be removed from the esophagus without first reversing the reamer and drawing the same into the casing.

Manifestly, the construction shown is capable of considerable modification and such modification as is within the scope of my claims, I consider within the spirit of my invention.

I claim:

1. A device of the character described including a flexible tubular casing, and rotatable cutting means normally arranged in one end of said casing but capable of moving outwardly therefrom upon rotation.

2. A device of the character described including a flexible tubular casing, rotatable cutting means normally arranged in one end of said casing, but capable of moving outwardly therefrom upon rotation, and cutting blades arranged upon the outer surface of the casing adjacent said end thereof.

3. A device of the character described, including a flexible tubular casing, a rotatable reamer normally mounted in one end of said casing, but capable of moving outwardly therefrom upon rotation, a cutter carried by said reamer, and a plurality of cutting blades secured to the outer surface of the casing adjacent said end thereof.

4. A device of the character described including a flexible tubular member, cutting means normally mounted in one end of said member, but capable of moving outwardly therefrom upon rotation, and a plurality of cutting blades secured to the outer side of the member adjacent said end thereof.

5. A device of the character described including a flexible tubular casing, a screw threaded shaft mounted in bearings in said casing extending to a point adjacent one end of the same, means for imparting rotary motion to said shaft, a reamer carried by the shaft, a cutting member carried by the shaft adjacent said reamer, and a plurality of cutting blades secured to the outer surface of said casing adjacent said end thereof.

In testimony whereof, I affix my signature hereto.

WILLIAM HENRY COREY.

Copies of this patent may be obtained for five cents each, by addressing the "Commissioner of Patents, Washington, D. C."